April 23, 1957     E. G. BIGGS     2,789,353
APPARATUS AND METHODS FOR EFFECTING INTRA-ORAL
SELECTION OF ARTIFICIAL TOOTH MOLDS
Filed Feb. 15, 1954
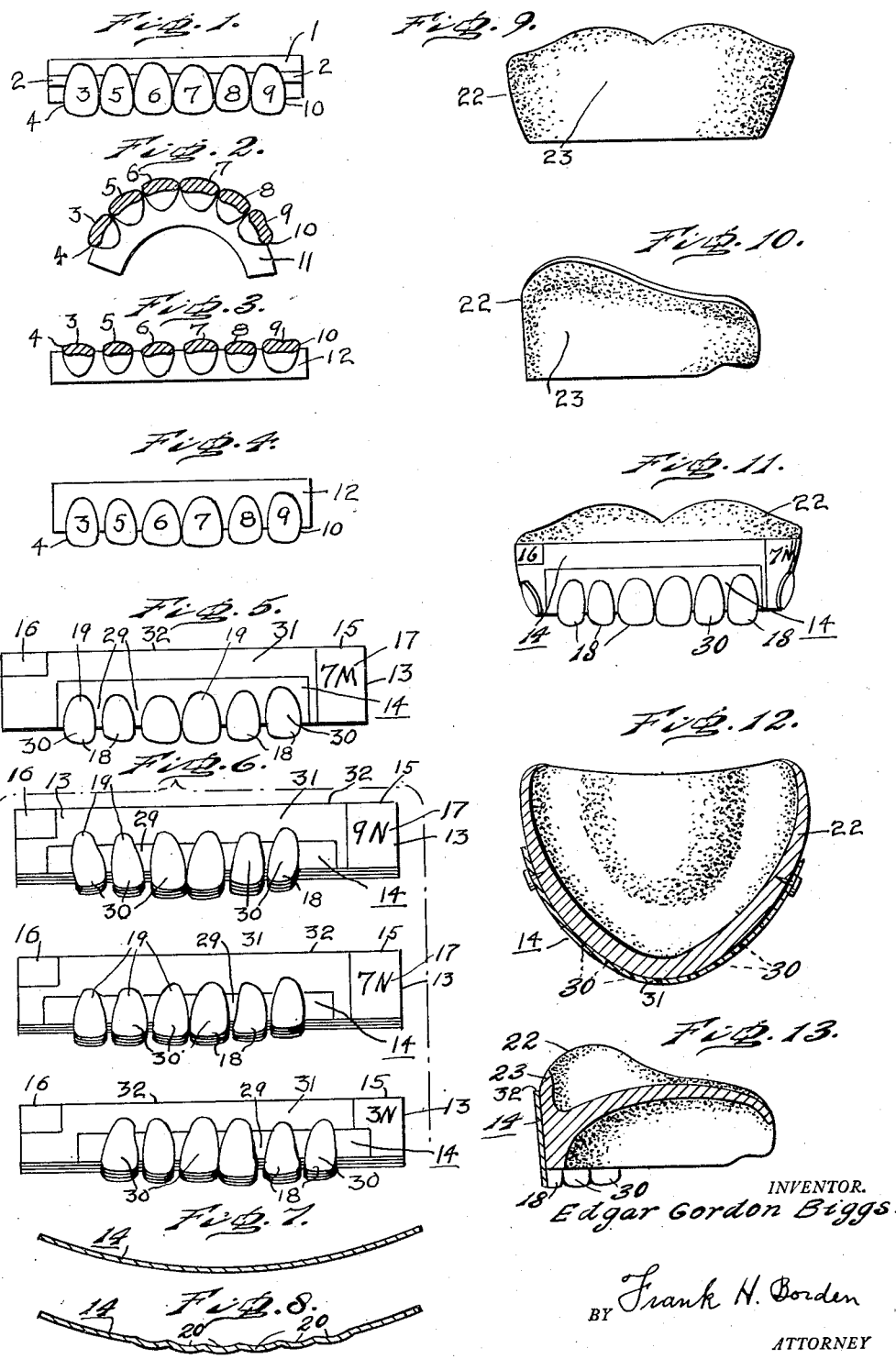
INVENTOR.
Edgar Gordon Biggs.
BY Frank H. Borden
ATTORNEY

United States Patent Office 2,789,353
Patented Apr. 23, 1957

2,789,353

APPARATUS AND METHODS FOR EFFECTING INTRA-ORAL SELECTION OF ARTIFICIAL TOOTH MOLDS

Edgar Gordon Biggs, Merion Park, Pa., assignor to H. D. Justi & Son, Inc., Philadelphia, Pa., a corporation of Pennsylvania Application February 15, 1954, Serial No. 410,199

5 Claims. (Cl. 32—71)

This invention relates to apparatus and methods for effecting intra-oral selection of artificial tooth molds, preliminary to the formation of a case or denture, a plate or false teeth.

One of the inescapable procedures in the formation of prosthetic appliances for the dental profession, to wit, dentures, or cases, is the selection of tooth forms, sizes and shades for the individual patients, if reasonable accuracy and compatability are to be attained. Although some practitioners resort to a simplified extra-oral procedure involving measurement of the dimensions and form of the individual face, supplemented in some cases by casts of the patient's ridges, this requires a series of interpolations and is consequently lacking in the high accuracy normally considered essential, while still representing a fairly expensive and time-consuming method.

The only other known method is by the use of the bite block, and this use, in either of the manners presently used, is fraught with disadvantages. One form of use is actual intra-oral use by the dentist of bite-block-mounted full size specimen teeth, by which accurate selection of the size and shape of the teeth in the ultimate denture is secured, but in which the fullness and length facial contours of the patient sought by the bite block, are undesirably affected. The other use is selection of the size and shape of the teeth by the technician only from measurements of the bite block, in which, while the contours are maintained, the shape of the teeth in the ultimate denture are incompatible with the characteristics of the particular patient, which latter the technician probably never sees.

The bite block is molded from some such workable material as wax to conform to the patient's ridges and the external surfaces thereof are successively built up, or reduced, to establish, in position in the patient's mouth, the lip and cheek-contacting thickness for the proper facial fullness and length characteristics, and the proper distance between the upper and lower jaws. This contour establishment is frequently a painstaking and time-consuming function of the dentist. After the establishment of the proper bite block, the courses of selection of the ultimate tooth mold may be intra-oral or extra-oral according to the care, interest and available time of the dentist. In many cases, if not in most cases, he avoids an onerous duty and sends the bite block to the technician with his designation of shade for the ultimate tooth and requests him to select and apply the proper tooth mold to the denture. The technician makes painstaking micrometric measurements to determine the size, but he must guess as to the shape. He builds the denture with his more or less blindly selected teeth, and it is a matter of luck whether the ultimate denture in the patient's mouth mounts teeth of the proper shape, and, if, incompatible with the characteristics of the patient, then, usually at the technician's expense, he must reconstruct the denture with teeth of different shape. This wastes time and expense of all concerned, although the facial contours and jaw spacing is maintained. The other use of the bite block for the purpose involves use of what are called mold guides, in effecting truly intra-oral selections.

It is the practice of manufacturers of artificial teeth to produce, and of dentists and technicians to acquire, mold guides. The latter constitute collections of artificial teeth arranged in related series arrangement on lightly bonding supporting strips, and classified according to the code designations of the given manufacturer, according to shape and size.

Practically from the beginning of the commercial manufacture of artificial teeth the mounting of the related series of teeth on the supporting strips has been with the related series of teeth in mutual lateral contact with the labial surfaces lying generally in a plane. This facilitates observation of the size and shape characteristics and makes a compact and handy mode of handling while keeping the specific related teeth firmly together. This mounting form establishes a given distance from the distal surface of an end tooth of the series at a measurable distance from the distal surface of the other end tooth of the series, across the labial surfaces of all of the teeth of the series, which measurment is known as the "flat set width" of the teeth. There may be a large number of individual sets or series of the specimen teeth, even up to 100 in the various combinations available, with the teeth specimens of each set or series related in size and shape to the adjacent teeth of the given series. The laboratory or technician has collections of artificial teeth classified in shape and size with the code symbols of the mold guide, and these are again classified according to shadings. In accordance with mold guide practices, the dentist, after carefully shaping the bite block to establish the facial contours of the patient, as noted, uses this same bite block to mount specimen teeth. The dentist, with heated spatulas or the like, gouges out the external surfaces thereof to form recesses into which selected teeth specimens taken from the flat set on the given bonding support strips can enter and be secured. The removal of material of the bite block for this purpose in many cases destroys the profile effect originally sought and initially attained. Assuming the six anterior teeth to be involved, for example, as requiring the utmost in extreme accuracy, the dentist selects one series of six related specimen teeth from his mold guide and individually and successively mounts them in the gouged-out recesses in the anterior surface of the bite block, hoping that his initial series selection has been proper for the mouth of the particular patient, and then disposes the bite block, with the mounted selected specimen teeth, in the patient's mouth. If his selection has been improper, these, then unsterile, specimen teeth are individually successively removed from the bite block and returned individually to mounting on the strip from which they are taken in the mold guide. The dentist then must select another specimen series of different size or shape or both, and, possibly with changes in the gouged-out recesses, repeat the performance, until the bite-block-mounted teeth are found to be proper for the patient's mouth. As the specimen teeth are expensive, the dentist usually again individually removes the finally selected specimen teeth from the bite block and returns them to the strip from which they were taken from the mold guide. He then, or the technician ultimately, refills the recesses with other wax or the like, but by eye only, and not in connection with the reestablishment of the exact initial contours of the bite block with actual tests in the patient's mouth, and hands or forwards the marred bite block to the technician, together with the prescriptive code of the size and shape and the shade desired. As noted, the technician then makes the ultimate denture with exactness so far as tooth mold selection is concerned, but with possible variations from the desired profile-establishing factors of the bite block.

It is important to observe that when the related series of teeth taken from the flat set on the mold guide supporting strip are properly mounted on the bite block, in lateral contacting relation, the teeth mounted on a general arc are each relatively rotated so that the contact points between adjacent teeth move lingually from or distally from the locations thereof on the flat set width, and are on a general curve so that the distal surface of one end tooth of the series is spaced from the distal surface of the other end tooth of the series across the labial surfaces a distance from 5% to 10% greater than the flat set width measurement. This measurement on the arc is designated as the "curved set width."

It will be seen that present practices are unduly expensive and time-consuming, both on the part of the dentist and the technician and also on that of the patient, the ultimate results are frequently haphazard in effectiveness and accuracy and finally, that in the only complete intra-oral selection method non-sterile specimen teeth are used over and over in various patient's mouths, as it is impractical to sterilize the specimen teeth in the mold guide. It will be understood that the problem is common to both anterior and posterior teeth, but it is much more important and acute in the anterior teeth, and it is with these, particularly and preferably, that this invention deals. While both upper and lower anterior teeth are involved in the problem, there is a controlling relationship in shape and size, between the uppers and lowers, and for simplicity the invention will be discussed in its basic aspects in connection with an upper bite block and upper anterior teeth.

It is among the objects of this invention to provide an improved apparatus and method for the intra-oral selection of artificial tooth molds; to provide an apparatus for facilitating and cheapening intra-oral selection of tooth molds; to reduce the costs normally attaching to the intra-oral selection of artificial tooth molds; to provide an apparatus for facilitating accurate selection of anterior teeth molds with prescriptive coding means further facilitating the actual tooth mold specimens used in the dental laboratory, both as to size and shape and also as to shade; to enhance the cleanliness and hygenic conditions of intra-oral selection of artificial tooth molds to a degree never before possible; to provide a method and means for intra-oral selection of artificial tooth molds in which the contours of the anterior surface of the bite block and the tooth length and facial profile thus secured are preserved, instead of being destroyed, as with present conventional procedures; to provide a template of the six upper anterior teeth as a guide for intra-oral selection of the artificial tooth mold, which may be so cheap as to be discardable, or alternatively is susceptible to sterilization prior to re-use on another patient; to provide a template by which all six anterior upper teeeth may be simultaneously selected; to provide a template of a generally planar reproduction of an aligned series of teeth for use on a bite block, of such thinness that it does not appreciably disturb or distort the profile established by the bite block itself; to provide a template of a reproduction of a series of specimen teeth for mounting on a bite block for intra-oral inspection without destruction or marring of the anterior surfaces of the bite block; to provide a method for forming a template for the intra-oral selection of anterior teeth; to provide a generally planar template showing anterior teeth reproductions with such spacing between the teeth as to establish on the planar template a curved set width across the labial surfaces of the reproduction to establish accuracy in the tooth selection; and to provide other objects and advantages as will appear as the description proceeds.

In the accompanying drawings forming part of this description:

Fig. 1 respresents a front elevation of six anterior artificial teeth related in size and shape mounted on a bonding strip as a mold guide unit in a flat set width thereof.

Fig. 2 represents an average maxillary arch of wax or the like with the artificial teeth selected from the mold guide unit of Fig. 1 shown for convenience in transverse section, disposed in a general arc with the labial surfaces thereof on a general arc and establishing a curved set width of the series of anterior teeth as so mounted. This represents an upper maxillary arch reproduction, inverted for convenience.

Fig. 3 represents the same series of teeth on a planar mount each in transverse section for convenience with the labial surfaces thereof in a general plane preparatory to reproducing same photographically or by like means with the respective teeth arbitrarily spaced to establish the curved set measurement thereof on the template.

Fig. 4 represents a front elevation of the teeth in their curved set relation as established in Fig. 3.

Fig. 5 represents a front elevation of a single template according to the invention constituting a reproduction of the tooth organization of Figs. 3 and 4, which is used in the intra-oral selection of artificial teeth. The template bears on the surface a reproduction of six relatively spaced dimensionally related, aligned full size anterior artificial upper teeth, coordinated in size and shape to a code index symbol appearing on the template, in turn coordinated with the graded teeth possessed by the laboratory tchnician, and illustrative of a greater number of different templates comprising the invention.

Fig. 6 represents three illustrative sets or stacks of templates, showing multiple templates of the description of that of Fig. 5 with each set showing reproductions of different sizes and shapes of artificial teeth, respectively related on the individual stack and bearing respective different code identifications.

Fig. 7 represents a horizontal section through the template of Fig. 5.

Fig. 8 represents a horizontal section through a modified form of template embossed to indicate contours on the reproduced teeth of the template.

Fig. 9 represents a front elevation of a typical bite block.

Fig. 10 represents a side elevation thereof.

Fig. 11 represents a typical bite block according to Fig. 9, with the template of Fig. 5 mounted on the superficial unmarred anterior surface of the bite block, for insertion into the mouth of a patient according to the invention.

Figs. 12 and 13 represents respectively horizontal and vertical sections through the assembled bite block and template of Fig. 11.

According to the present mold guide practices the carefully molded and shaped bite block 22, having the external contour-determining surfaces 23, is excavated or gouged-out in the anterior surface 23 to form recesses, there being six such recesses formed when a full set of such anterior teeth are to be selected. A single specimen tooth is then pushed and secured properly in each recess. When the specimen teeth are removed, the excavations or recesses have markedly spoiled the accuracy of the surface 23 of the bite block. It is usual for either the dentist or the technician, in the absence of the patient, to patch the bite block by fillings. This is done, of course, so as to come as close as possible to the initial contour, but in the absence of accurate building-up or partial removing of the filling material and the edges of the recesses to reestablish the desired conformation by actual trial in the patient's mouth to secure the sought profiling effect, it is a makeshift making for inaccuracy.

As noted, the various related sizes and shapes of artificial teeth of the given manufacturer are mounted in sets of six on a light bonding support such as a strip of wax. A typical mold guide unit as thus formed comprises a backing support 1, having a channel mounting wax as at 2, and a series of teeth are mounted by adherence to the wax, in lateral contact illustratively as follows: A cuspid 3, having a distal surface 4 forms one end of the series, and is in contact with a lateral 5, and the series proceeds through a central 6, a second central 7, a lateral 8, and a cuspid 9, having a distal surface 10. The organization described comprises a mold guide unit, and all of the labial surfaces of the teeth lie in a common general plane, and the distance across the labial surfaces from the distal surface 4 of the cuspid 3 to the distal surface 10 of cuspid 9 is the flat set width.

In carrying out the invention it is desired that the ultimate reproductions of the artificial teeth on the templates shall be as the teeth appear in the mouth. To this end an average edentulous maxillary arch 11 is formed, as shown in Fig. 2, and the teeth from the mold guide, or from any other source of teeth by which a series of teeth related in size and shape can be produced, and these teeth 3, 5, 6, 7, 8, and 9 are then physically mounted on the average arch 11 described so that the labial surfaces thereof lie in a general common curve.

Anterior teeth such as the cuspids, laterals, and centrals are irregularly shaped articles in transverse section. While not exactly trapezoidal they have related dimensions in the sense that the labial surface is the greater width, while the lingual surface is of narrower or smaller width. When an anterior tooth is mounted and photographed from the front it is, of course, only the labial surface which is reproduced. When a series of anterior teeth are mounted in aligned series in a general plane and in mutual contacting relation at or toward the incisal tips of the labial surfaces thereof, as shown in Fig. 1, the flat set width mentioned between the extreme distal surfaces of the series is of a given measurement. When these same teeth are mounted as they are in the human mouth, or in the simulation thereof comprising an average human maxillary arch or alveolus 11, in a general arc, although generally the centrals are not appreciably changed in relative attitude, the laterals and cuspids are effectively relatively rotated, and although contact therebetween, and between the laterals and centrals is maintained, the contact rolls or moves to a point lingual or distal of the contact point attained when the series lies in a general plane. This rotation and contact shift thus effects a spacing of the labial surfaces of contiguous teeth over the flat set relation. This increases the linear distance across the labial surfaces of the series. This distance, on the periphery of a general arc from distal surface 4 of cuspid 3 to distal surface 10 of cuspid 9, comprising said curved set width, which may exceed the flat set width of the same teeth by as much as 5% to 10% of the flat set width measurement, depending for its order upon the size and shape of the teeth and the actual arc attained. In order to establish fidelity and accuracy in the template reproductions to be described, it is absolutely necessary that this curved set width be maintained. To this end the curved set width from distal surface 10 of tooth 9 across the labial surfaces of all of the teeth and to the distal surface 4 is carefully measured. For convenience this is usually measured in millimeters.

With this curved set width measurement identified, the teeth 3, 5, 6, 7, 8, and 9 are removed from the average maxillary arch 11, and are mounted on a planar support 12, in the proper order, with the labial surfaces of all of the teeth of the series in a general plane, and with the distance across the labial surfaces from the distal surface 4 of cuspid 3 spaced from the distal surface 10 of cuspid 9 the curved set width previously measured, when the teeth were disposed on an arch as in Fig. 2. This leaves a differential of the said 5% to 10% between the flat set width and the curved set width. This differential is consumed by effecting an arbitrary spacing between the cuspids and laterals and between the laterals and the centrals, and for general purposes the centrals are permitted substantial contact. Tests have indicated that accuracy is enhanced if the said differential is divided slightly unevenly, with a little greater spacing between the cuspids and laterals, than between the latter and the centrals. While to establish the points the relative spacings of the cuspids from the laterals and from the laterals to the centrals has been exaggerated in Figs. 3 and 4, and in the templates made therefrom, to be described, it is this spacing that is an essential if actual utility of the templates is to be secured.

The mounted spaced teeth of Figs. 3 and 4 are then reproduced by photographic, pictorial, or artistic reproductions in the exact size of the tooth forms, 3, 5, 6, 7, 8, and 9, comprising the aligned row of said teeth of Figs. 3 and 4.

The reproduction of each given row of full size teeth specimens similar to those of Fig. 4 are imprinted on one side of a thin sheet of paper, plastic, metal, or other similar flexible material 13, in as many similar reproductions of the given row as may be found desirable. For simplicity, the various teeth reproductions are all identified as 30. Each so reproduced row is formed as a template 14, which, preferably, includes a side lateral extension 15, or extensions 15 and 16, upon which prescriptive code data 17 as to the shape and size of the row is reproduced. Each template therefore permanently carries its own identifying data as to the characteristics of the specific teeth mold of the artificial teeth of that row. It preferably provides in space 16 an area for the dentist to indicate the shade of the desired tooth mold. When the mounted template 14 later reaches the laboratory technician, he can immediately identify, select and use the identical teeth represented by the specific template in the indicated shades. It is to be noted also that the dentist, by suitable markings on the reproduction, as by pen or pencil, can indicate in concise fashion where the laboratory technician should remove a tooth corner, or supply filling in a tooth or teeth, or otherwise change a selected tooth, in aiding the simulation of vital teeth.

In facilitating the use of the templates for the intended purpose, to be described, it is desirable to die cut or otherwise shape the incisal tips 18 of the reproductions of teeth 30 to remove the remainder of the sheet to form the lower edge of the template as incisal tips of the reproduced teeth, with approximately the incisal third of the teeth projecting downwardly below the remainder of the template. Alternatively, if for any reason found more desirable, the reproduction of the rows of dimensionally related teeth can be printed or reproduced on a transparent plastic or like sheet which may extend below the incisal tips 18 of the teeth reproductions 30. In general the die or similarly cut incisal tip terminations as the lower edge of the template is preferred, as it produces a more natural aesthetic effect and a more accurate means for mechanical study when used in the manner to be described. The upper limits of the template, if desired, may also be formed by die or otherwise cutting out the sheet above and about the upper root ends 19 of the teeth, with a connecting strip of gum-tissue colored reproduction 29 disposed between the reproductions 30. Preferably, however, the upper ends 19 of the reproduced teeth 30 are silhouetted against a contrasting pink or red background 31, continued above the tooth ends 19 to form the upper limits of the template at 32. This comports well with the desired visual contrasts to be sought in the patient's mouth when installed as will be described, and furnishes a background upon which the tooth manufacturer can place his identification, and upon which, if desired, the code designation for size and shape may be placed, in place of the space 16 described. Similarly, a clear space may be placed on the background 31 for reception of the inscribed coding for the desired shade, in place of the space extension 16, as described. This frees the ends of the templates from the space extensions and broadens the field for the reception of thumb tacks or the like without concealing the code designations.

Additionally, if desired, the templates may be selectively embossed in any desired manner, so as to impart to the teeth reproductions 30 an outward bulge as at 20, in Fig. 8, with the creation of an anterior-posterior depth effect.

The practitioner is provided with complete sets in multiples of each template of the given manufacturer, which, with the combinations of size and shape available, as in the case of the mold guides, may amount to as many as 100 different templates. As noted, he is preferably provided with pluralities of each template. As these templates in quantities are very cheap to print or reproduce and are quite thin, they are cheaper to use and far easier to store than the bulky, expensive, and non-sterile more or less loose tooth specimen forms of the prior mold guide practices.

The first step in the use of the invention is the formation of the bite block 22 for the particular patient. An important feature of the molded bite block is the conformance of the external surfaces 23 thereof to the lip and cheek conformation as well as to the length of the tooth in establishing or maintaining the facial profile and in establishing the proper relation between the upper and lower jaw. With the bite block ready, the practitioner selects a given template 14 of the multiplicity available, and lightly adheres it to the anterior surface of the bite block. This attachment may be made by hot wax or by suitable attaching media or strips on the template or directly by thumb tacks, staples, or the like. The bite block bearing the attached and mounted template is then inserted in the patient's mouth to determine whether the size and form of the teeth being selected is suitable for the mechanical and aesthetic requirements of the individual patient. If inspection indicates that the selected template is not the proper series for the individual patient, or it is not properly placed on the bite block, the template can be shifted to a new position, or removed and replaced with another template comprising the proper series, and so on until the exactly proper one is mounted for the next step in the creation of the denture.

If proper, the patient is excused and the bite block bearing the template carrying the coded prescription data and shade designation is given to the technician or commercial laboratory for the formation of the denture, with certainty that the teeth attached to the latter will be identical with those tried, by template, in the patient's mouth.

It will be seen that with cheap discardable templates, each can be discarded after one trial, and a fresh, clean one used for a replacement, or, alternatively, that the templates can be sterilized and replaced in the stacks of templates when formed of metal, for instance. It will further be seen as of importance that the entire series of anterior teeth are mounted, effectively, as a single unit on the bite block, in place of the individual tooth mounting of the present practices, and that the carefully molded anterior surface 23 of the bite block is not destroyed but is maintained by the simple superficial thin template attachment thereover. It has been pointed out that the use of individual tooth forms on the bite block, in which the teeth are pressed individually and separately into the bite block after suitable excavations therein necessarily destroys the carefully molded and shaped surfaces of the bite block.

It is preferred that the templates be stiff enough to be form-retaining, while flexible enough to freely conform to the peripheral contour of the bite block, so that attachment to the bite block at or toward the ends of the template maintains the proper disposition of the template remote from those ends. It is preferred, furthermore, that the templates generally be substantially paper thin, substantially regardless of the material used, so that when superficially imposed against the periphery of the bite block, it adds so inappreciably to the thickness as not materially to affect the facial contours of the patient, when disposed in the patient's mouth. A thickness in the range between .25 mm. and .5 mm. secures this result.

It will be understood that in the commercialization of artificial teeth it has been conventional for manufacturers thereof to make photographic or like reproductions of series of mold guide units showing the various combinations of sizes and shapes in their coded identification, and all of these have been pictorial representations of the mold guide units as shown, for instance, in Fig. 1 hereof, in mold guide charts, brochures, or other forms of literature for prospective customers. So far as known, they have always been of the mold guide units in which the teeth are disposed in the flat set width relation with the teeth in mutual contact usually toward the incisal tips thereof. There have been attempts in the prior art to approximate applicant's important and unique results by using such pictorial representations of a related series of artificial teeth with such flat set width pictorial organizations, and without known exception they have been incapable of successful utilization and have had no commercial acceptance whatever. It will be evident that when such pictorial representation of teeth are applied to a bite block or other approximation of the maxillary arch, and viewed in the mouth, they are grotesque and completely incapable of attaining accuracy or, indeed, any semblance of accuracy in the selection of the proper teeth for the given mouth, as inevitably the selected teeth chosen from the flat set width reproductions are too large, and the whole value of the supposed aid to selection is lost. When the flat set width template is mounted on a curve, the distance between the extreme distal surfaces of the series is less than the curved set width by the said 5% to 10%, so that, for instance, the central longitudinal axes of the cuspids are so displaced with relation to the facial requirements of the patient that in order to dispose these properly a larger set of pictorial teeth is necessary to be mounted on the bite block to visually dispose the teeth in their proper order in the mouth, so far as visual indication is concerned. When, however, these larger teeth are placed for final arrangement for the denture, owing to the relative rotation of the respective teeth in the mounting and the spacing of the labial surfaces as a concomitant factor, the selected teeth are so large that the whole assembly is inoperative and cannot be used. It is safe to say and can be proven that it is completely impossible ever to use a flat set width of template for the satisfactory accurate selection of artificial teeth. Applicant by first attaining a curved set width for his teeth, then reproducing this width in a planar row and establishing the spacing recited between the cuspids and laterals and between the laterals and the centrals has for the first time presented a completely operative accurate intraoral selection means.

Although the templates have been shown as of appreciable vertical width, vertical height is not essential and a more compact form may be resorted to as all that is necessary is to include the full-size teeth merging into a background and with a tab extending laterally from each side of the template.

The advantages of the invention will be evident.

This application constitutes a continuation-in-part of application Serial Number 313,713, filed October 8, 1952, now abandoned.

Having thus described my invention, I claim:

1. The method of forming templates for the intraoral selection of anterior teeth which comprises mounting a series of artificial teeth of coded size and shape upon a reproduction of an average edentulous maxillary arch, and measuring the distance across the labial surface of said teeth from the distal surface of one end tooth of the series to the distal surface of the other end tooth of the series to determine the curved set width thereof, mounting teeth of said coded shape and size upon a generally planar mount in substantially planar alignment with the distance across the labial surfaces of the teeth between the distal surface of one end tooth and the distal surface of the other end tooth of the series substantially the same as said curved set width with spacing between some at least of contiguous teeth, reproducing the planar mounted teeth as a template.

2. The method of forming templates for the intra-oral selection of anterior teeth, which comprises mounting a series of artificial teeth of related size and shape upon an average edentulous maxillary arch, measuring the distance between the distal surface of the tooth at one end of the series of artificial teeth to the distal surface of the tooth at the other end of the series across the labial surfaces of all of the teeth as a linear measurement, placing teeth of the same relative size and shape in a series on a substantially planar mount with the labial surfaces of said teeth in a general plane and with the teeth in general lateral alignment to establish a flat set of the teeth, said placement disposing the distal surfaces of the respective end teeth of the series a distance apart substantially equivalent to said linear measurement and absorbing the difference between the said linear measurement and a measurement between said respective distal surfaces with the teeth in said lateral alignment in a plane and in contact by spacings between some at least of said series, and reproducing the disposed teeth as a template.

3. The method of forming a template for the intra-oral selection of anterior teeth, which comprises mounting artificial teeth of related size and shape in a series comprising two cuspids, two laterals and two centrals upon a reproduction of an average edentulous maxillary arch, measuring the distance between the distal surface of one cuspid across the labial surfaces of all of said teeth to the distal surface of the other cuspid as a linear measurement, placing substantially identical teeth in the same series on a mount so that the labial surfaces of all of the teeth of the series have a common substantially planar relation in a flat set organization, said placement disposing the distal surfaces of the respective cuspids substantially the same distance apart across the labial surfaces of all of the teeth as said linear measurement, said placement effecting a spacing between the cuspids and laterals and between the laterals and centrals substantially adequate to absorb the distance differential between said linear measurement and a related measurement from the same teeth if in mutual lateral contact, and reproducing the so placed teeth as a template.

4. A device for the simultaneous intra-oral selection of a plurality of anterior teeth, comprising a generally planar template bearing the visual reproduction of the labial surfaces of an aligned related series of full size artificial tooth specimens of curved set width in flat set width relation, with the differential between said respective widths absorbed by relative spacing of some of the teeth, the incisal tips of such reproductions forming part of the lower edge of said template and being outlined to extend beyond the remainder of the lower edge by approximately the incisal third of the teeth.

5. A device for the simultaneous intra-oral selection of a plurality of anterior teeth comprising a generally planar template bearing the visual reproduction of an aligned related series of full size artificial tooth specimens for mounting on a bite block, the incisal tips of such reproductions forming part of the lower edge of said template and being outlined to extend beyond the remainder of the lower edge by approximately the incisal third of the teeth.

References Cited in the file of this patent

UNITED STATES PATENTS

| | | |
|---|---|---|
| 1,654,387 | Stenz | Dec. 27, 1927 |
| 2,169,719 | Bush | Aug. 15, 1939 |